(12) United States Patent
Saur et al.

(10) Patent No.: US 12,051,194 B2
(45) Date of Patent: Jul. 30, 2024

(54) SCANNING IMAGE GENERATION APPARATUS AND SCANNING IMAGE RECORDING METHOD

(71) Applicant: Carl Zeiss Meditec AG, Jena (DE)

(72) Inventors: Stefan Saur, Aalen (DE); Christoph Hauger, Aalen (DE); Gerald Panitz, Bopfingen (DE)

(73) Assignee: Carl Zeiss Meditec AG, Jena (DE)

( * ) Notice: Subject to any disclaimer, the term of this patent is extended or adjusted under 35 U.S.C. 154(b) by 340 days.

(21) Appl. No.: 17/185,634

(22) Filed: Feb. 25, 2021

(65) Prior Publication Data

US 2021/0279865 A1 Sep. 9, 2021

(30) Foreign Application Priority Data

Mar. 3, 2020 (DE) ...................... 10 2020 105 696.6

(51) Int. Cl.
*G06T 7/00* (2017.01)

(52) U.S. Cl.
CPC .. *G06T 7/0012* (2013.01); *G06T 2207/10056* (2013.01); *G06T 2207/10068* (2013.01); *G06T 2207/20081* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 9,921,406 B2 | 3/2018 | Wang et al. | |
| 11,416,963 B2* | 8/2022 | Kirszenberg | ........... H04N 23/69 |
| 11,593,917 B2* | 2/2023 | Hoyer | ................... G06T 3/0068 |
| 2010/0157308 A1 | 6/2010 | Xie | |
| 2012/0127297 A1 | 5/2012 | Baxi et al. | |
| 2016/0051131 A1 | 2/2016 | Jeong et al. | |
| 2017/0103512 A1 | 4/2017 | Mailhe et al. | |
| 2018/0144466 A1 | 5/2018 | Hsieh et al. | |
| 2019/0350564 A1* | 11/2019 | Gajdos | ................. G09B 23/286 |

(Continued)

FOREIGN PATENT DOCUMENTS

| | | |
|---|---|---|
| CN | 108042090 A | 5/2018 |
| DE | 10 2019 113 493 A1 | 11/2019 |

(Continued)

*Primary Examiner* — Nancy Bitar
(74) *Attorney, Agent, or Firm* — Walter Ottesen, P.A.

(57) ABSTRACT

A scanning image generation apparatus is provided and includes an image information acquisition unit for scanning grid points of an object and for acquiring, on the basis of the scanned grid points, items of image information that represent an image. An evaluation unit has a software routine for evaluating at least some of the items of image information and for classifying the items of image information as usable or unusable on the basis of the evaluation. The apparatus also includes a release unit which enables an image recording if the evaluated items of image information are classified as usable by the evaluation unit. The scanning image generation apparatus moreover includes a memory with at least one quality profile stored thereon. The quality profile contains a person-specific software routine for evaluating and classifying the items of image information. The software routine is loadable into the evaluation unit.

10 Claims, 2 Drawing Sheets

(56) References Cited

U.S. PATENT DOCUMENTS

2020/0051239 A1\* 2/2020 Braun ................ G01R 33/5608
2020/0129263 A1\* 4/2020 Izadyyazdanabadi ......................
    G06F 18/2413
2022/0076411 A1\* 3/2022 Georgescu ............. G16H 80/00

FOREIGN PATENT DOCUMENTS

WO      2018/152248 A1    8/2018
WO    WO-2020243556 A1 * 12/2020   ........... G06K 9/0014

\* cited by examiner

SCANNING IMAGE GENERATION APPARATUS AND SCANNING IMAGE RECORDING METHOD

CROSS REFERENCE TO RELATED APPLICATION

This application claims priority of German patent application no. 10 2020 105 696.6, filed Mar. 3, 2020, the entire content of which is incorporated herein by reference.

FIELD OF THE INVENTION

The present invention relates to a scanning image generation apparatus comprising an image information acquisition unit for scanning grid points of an object and for acquiring image information items on the basis of the scanned grid points, and to a scanning image recording method. The scanning image generation apparatus can be an endomicroscope, for example. Scanning image generation apparatuses, for instance endomicroscopes, and scanning imaging methods are used increasingly in the field of medical imaging for the purposes of recording images that should form the basis for a histological assessment of tissue. Images of this type are referred to hereinafter as histology images.

BACKGROUND OF THE INVENTION

For the histological assessment of tissue, it was previously necessary to take a tissue specimen and produce a section from the acquired tissue specimen, the section then being observed under a microscope by a pathologist for the purposes of the histological assessment. This method is time-consuming and complex since the specimen has to be taken and the section may have to be stained to bring about an increased contrast before the pathologist can undertake the assessment.

Tissue must frequently also be assessed during surgery and so-called fast section methods are used to this end; these are able to perform the aforementioned steps particularly quickly so that as little time as possible passes until the pathological assessment is available. Nevertheless, the fast section method is connected to a loss of time, which should be avoided where possible during surgery. Therefore, more recent developments are directed to recording a histology image, which can be evaluated by a pathologist, by means of an endomicroscope. In this case, the histology image has a resolution facilitating the identification of individual cells in the image.

Preferably, the resolution is even so high that the structures of individual cells, such as the cell nucleus, for example, can be identified. In particular, the resolution can be 10 µm or better, for example 5 µm, 3 µm, 1 µm or 0.7 µm. Consequently, the histology image represents an image which allows the identification of tissue types, in particular tumor cells, on the basis of morphological criteria such as the cell structure, the size of the cell nucleus, et cetera. Typically, a histology image shows an object section of 1 $mm^2$ or less, for example 5 $mm^2$, 0.2 $mm^2$, 0.1 $mm^2$ or even less.

Not every histology image recorded by the endomicroscope is suitable for pathological evaluation. By way of example, lack of resolution, lack of focusing or movement unsharpness on account of the movement of the tissue during the scan can impair the utility of the recorded histology image. Moreover, reflections at liquid films or an unsuitable illumination setting may lead to the pathological evaluability of the recorded histology image being reduced.

Recording a histology image requires a high-resolution scan of the tissue region for which the histology image should be acquired, for the purposes of which the scan requires a certain amount of time. Moreover, the high-resolution image must be transferred to the pathologist's computer. Here, the time required for the scanning recording of the image and the duration of the transfer increase with increasing resolution. Should the pathologist then determine that the high-resolution histology image is unsuitable for a pathological evaluation, it is necessary to repeat the entire process. Multiple repetitions thereof may be required until a suitable histology image is present.

A software application that allows a histology image to be assessed in view of its utility is described in US 2020/0129263 A1, for example. Therefore, this method can aid a pre-selection of recorded histology images in view of their utility for a pathological evaluation. CN 108042090 A moreover has disclosed an endomicroscope comprising an AI chip with an image processing process implemented therein, the latter calculating a reliability coefficient and only transferring the image if the reliability coefficient of the image exceeds a threshold in order thus to reduce the transfer load. This provides the option of rejecting clearly unusable images and of only transmitting to the pathologist those images for which it is quite certain that these facilitate a pathological analysis.

Despite a pre-selection of recorded histology images in view of their utility for pathological evaluation, a pathologist may, if the criterion on which the pre-selection was implemented is not restrictive enough, nevertheless receive a histology image for which no pathological assessment can be undertaken. Nevertheless, if the criterion is too restrictive, there is also the risk of a pre-selection rejecting a histology image that a pathologist could still have evaluated.

SUMMARY OF THE INVENTION

It is therefore an object of the present invention to make available a scanning image generation apparatus and a scanning image recording method which facilitate a more accurate pre-selection in comparison with the described prior art.

A scanning image generation apparatus according to the invention, which may be an endomicroscope in particular, comprises an image information acquisition unit for scanning grid points of an object and for acquiring, on the basis of the scanned grid points, image information items that represent an image. Moreover, the scanning image generation apparatus comprises an assessment unit of an assessment unit for assessing at least some of the image information items and for classifying the image information items as usable or unusable on the basis of the assessment and a release unit which releases an image recording process if the assessment unit classifies the image information items as usable. A software routine is used in the assessment unit for assessing and classifying the image information items, the software routine preferably containing a trained neural network. However, the software routine might contain a conventional algorithm instead, the latter ascertaining at least one image quality value, comparing the at least one ascertained image quality value with one or more specified classification criteria and undertaking the classification on the basis of the result of the comparison. Within the scope of the present description, acquiring image information items should be understood to mean the transfer of the data of an image sensor to a short-term memory or main memory of the image generation apparatus while an image recording process should be understood to mean the transfer of the image information items located in the short-term memory or main memory of the image generation apparatus to a non-volatile memory such as, for instance, a hard disk drive, a flash EEPROM, an optical memory, et cetera, or the transmission of the acquired image information items into a network before the acquired image information items are deleted from the short-term memory or main memory of the apparatus. By contrast, if no image is recorded, the image information items contained in the short-term memory are overwritten by new image information items without having been transferred into the non-volatile memory or sent to the network. The image recording process can also comprise the replacement of the image information items contained in the short-term memory or main memory of the image generation apparatus with new image information items, for example image information items at a higher resolution or image information items showing a larger section of the observation object, before the acquired image information items are transferred into the non-volatile memory or the acquired image information items are sent to a network.

According to the invention, the scanning image generation apparatus comprises a memory with at least one quality profile stored thereon. The quality profile contains at least one person-specific software routine for assessing and classifying the image information items, which software routine is loadable into the assessment unit. If the software routine is a trained neural network, the person-specific software routine represents a trained neural network which has been trained with person-specific training data. By way of example, a pathologist can classify histology images as histology images that are usable or unusable for a pathological evaluation. The neural network is then supplied with the histology images and the classification undertaken by the pathologist as person-specific training data. By contrast, if the software routine is a conventional algorithm which ascertains at least one image quality value, which compares the at least one ascertained image quality value with at least one classification criterion and which undertakes the classification on the basis of the result of the comparison, parameter values of the algorithm used when ascertaining the image quality value and/or the at least one specified release criterion are selected in person-specific fashion in the person-specific software routine.

Preferably, all person-specific software routines contained in a quality profile are specific to the same person such that it is the quality profile itself that is person specific, wherein, for example, one of the software routines can be a person-specific trained neural network and another one of the software routines can be a person-specific algorithm. However, it is also possible that a quality profile contains a plurality of trained neural networks specific to the same person and/or a plurality of algorithms specific to the same person, these neural networks and/or algorithms having been trained, for example, for different uses or the parameter values and/or the release criteria thereof having been selected for different uses. In this case, different uses can be, for instance, the assessment and classification of image information items acquired using different processes, for example image information items acquired on the basis of fluorescence radiation or image information items acquired with the aid of a hyperspectral sensor.

The scanning image generation apparatus according to the invention allows the image quality of recorded images, in particular recorded histology images, to be checked in real time, that is, allows a check before the acquired image information items are transferred to a non-volatile memory or sent to a network. In the process, individual criteria, and also subjective criteria in particular, of the person for whom the images are destined, for instance individual and subjective criteria of the pathologist in the case of histology images, are taken into account during the check. In this way, the assessment and classification of the image information items can be matched precisely to the criteria preferred by the respective person. By contrast, the prior art described at the outset does not allow individual or subjective criteria of the person for whom the images are destined to be taken into account. In comparison with the prior art described at the outset, the transmission to a pathologist of histology images for which no pathological evaluation can be undertaken and the rejection of histology images for which a pathological evaluation could have been undertaken can for example be avoided more reliably using the scanning image generation apparatus according to the invention. Using a software routine that has not been adapted to the pathologist, as used in the prior art, it is by contrast only possible to use a generally valid criterion for assessing and classifying the image information items, possibly leading to a case where a recorded and transmitted image cannot be evaluated by one pathologist while another pathologist is able to evaluate the same histology image. The prior art therefore either needed the criteria for the assessment and classification of the image information items to be set so restrictively that the image quality of the recorded histology images is satisfactory for any pathologist or needed the acceptance that histology images that cannot be used by every pathologist are recorded and transmitted, possibly leading to unnecessary delays during surgery. By contrast, the present invention renders it possible to largely ensure that every pathologist only obtains those histology images that they are also able to evaluate. A corresponding statement applies to other images that are intended to be evaluated by persons.

A plurality of quality profiles can be stored in the memory of the scanning image generation apparatus. In that case, the scanning image generation apparatus also comprises a selection device, with the aid of which at least one of the stored quality profiles can be selected, the at least one person-specific software routine thereof being loaded into the assessment unit. In this way, it is possible to store an individual quality profile for a plurality of persons, for instance a plurality of pathologists, with whom there is regular cooperation, and so the person can change without a new quality profile needing to be established. If a team of two or more persons is to evaluate images recorded by the scanning image generation apparatus, the respective person-specific software routines from all quality profiles associated with the persons in the team can be loaded into the assessment unit. Then, it is possible to release an image for the recording only if the assessment unit classifies the assessed image information items as usable on the basis of all loaded person-specific software routines or on the basis of a plurality of the loaded person-specific software routines. Moreover, it is possible to establish a team-specific quality profile for a team, containing the person-specific software routines for all persons in the team.

Moreover, the scanning image generation apparatus can comprise a signal unit which, in particular, can also be part of the release unit. The signal unit outputs an information signal if the assessed image information items have been classified as usable by the assessment unit. By way of example, the signal unit can be an optical signal unit, for instance a lamp or a symbol on a monitor, an acoustic signal unit, for instance a loudspeaker for outputting a buzzer, a haptic signal unit, for instance a handle with a vibration alarm, et cetera. The user then has the option of releasing the image recording process following the information signal. Alternatively, it is possible for a trigger unit to be connected to the signal unit for the purposes of receiving the release signal. The trigger unit triggers the image recording process automatically following the reception of the release signal, and so there is no need for the user to intervene.

Within the scope of the invention, the image information acquisition unit is configured to assess and classify the image information items already during the acquisition thereof, on the basis of that portion of the image information items which is represented by the grid points scanned up to that point. If the assessment of the portion of the image information items already yields that the image information items can be classified as unusable, it is possible to start with the recording of new image information items even before the image information items are complete, that is, before the image information items represent a complete image.

In an advantageous configuration of the scanning image generation apparatus according to the invention, the image information acquisition unit is configured to scan fewer grid points for acquiring the image information items to be assessed and classified than for the image recording process. This allows image information items to be acquired relatively quickly, for which image information items the assessment and classification can take place. Both measures, the use of fewer grid points when scanning and the assessment of already a portion of the image information items, allow the classification of images to be carried out quickly and allow the time until image information items that represent an image classified as usable are available to be reduced. This is particularly true if both measures are implemented. By way of example, the fast classification of images is important within the scope of intraoperative recording of histology images.

In the scanning imaging method according to the invention, grid points of an object are scanned with the aid of a scanning image generation apparatus, which can be an endomicroscope in particular, and image information items representing an image are acquired on the basis of the scanned grid points. Then, an assessment of the image information items and, on the basis of the assessment, a classification of the image information items as usable or unusable is implemented on the basis of a software application for at least some of the acquired image information items. If the image information items are classified as usable, the image recording process is released. According to the invention, at least one person-specific software application is used as a software application for assessing and classifying the image information items. This can ensure that a recorded image is usable to the person tasked with evaluating it, that is, for instance that a recorded histology image can also in fact be pathologically evaluated by a pathologist. By way of example, the person-specific software application can be loaded from a stored quality profile. Here, a number of quality profiles can be stored, and so if the person for whom the recorded image is destined is changed, it is only necessary to load the at least one person-specific software application from the quality profile assigned to the respective person. It is also possible to load two or more person-specific software routines from quality profiles, and so the software routine for assessing and classifying the image information items then comprises two or more person-specific software routines. In this case, the image recording process can be released if the assessed image information items are classified as usable by at least the majority of the person-specific software routines, in particular if the assessed image information items are classified as usable by all person-specific software routines.

In the scanning image recording method according to the invention, the release unit can output a release signal to a signal unit if the at least one person-specific software routine has classified the assessed image information items as usable. Following the release signal, the signal unit then outputs an information signal to indicate to the user that the image recording process has been released so that they can manually prompt the image recording process. In addition or as an alternative thereto, the release unit can output the release signal to a trigger unit, which automatically triggers the image recording process following the reception of the release signal.

To quickly find image information items that meet the release criterion, there is the option of scanning fewer grid points for the purposes of acquiring the image information items than for the image recording process. As a rule, the full resolution of the image information is not required for assessing the image information items, and so, for example, valuable time can be saved during surgery by virtue of reducing the resolution for the purposes of finding image information which represents a histology image that is evaluable by the pathologist.

The at least one person-specific software routine can be a trained neural network, in particular, which has been trained using person-specific training data. This not only facilitates individual training of the neural network for individual persons but also retraining, for example if the preferences of a person change.

Within the scope of the scanning image recording method according to the invention, the image information items can already be assessed and classified while they are being acquired, the assessment and classification being performed on the basis of that portion of the image information items which is represented by the grid points scanned up to that point. This can save valuable time, for example during surgery, by virtue of terminating the scan as soon as the assessment yields that the image information items cannot be classified as usable. In that case, it is not necessary to wait for all image information items representing the image to have been acquired before a new scan is started.

The image recorded after the image recording process has been released can be stored on a non-volatile storage medium or sent to a network.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
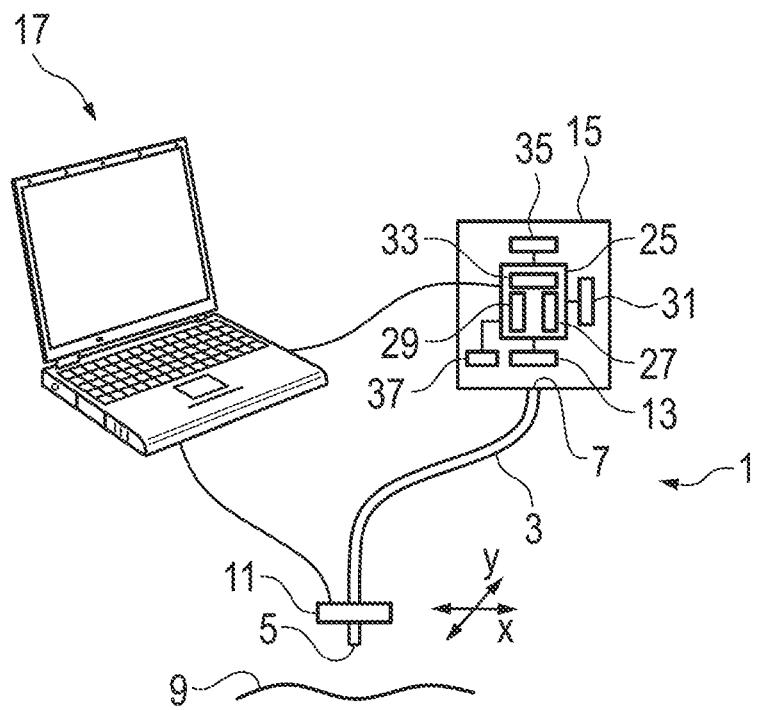
FIG. 1 is a schematic of an endomicroscope as an embodiment for a scanning image generation apparatus.
Figure 2:
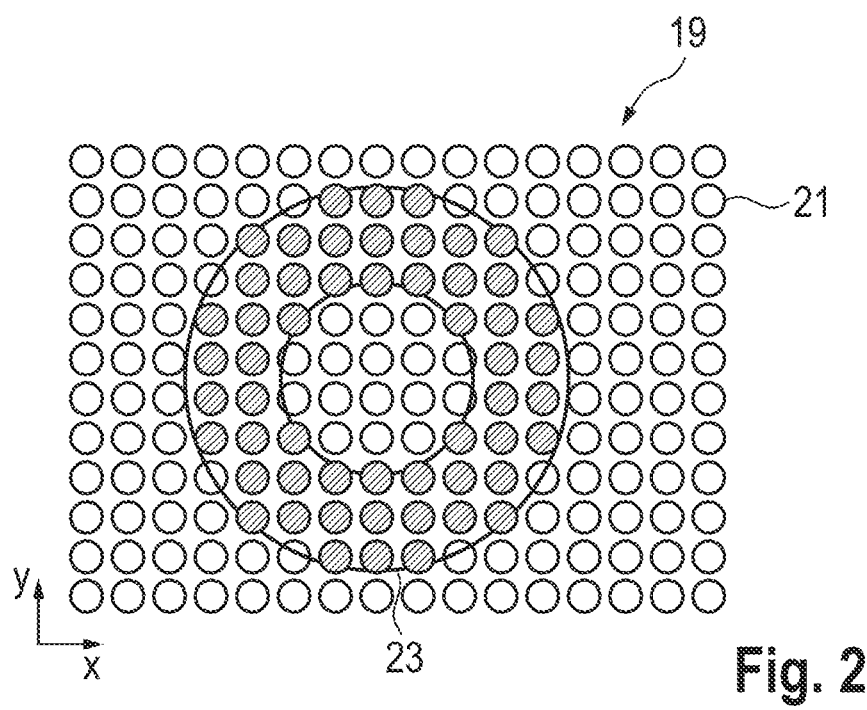
FIG. 2 shows an example of a grid that can be used when scanning an observation object; and, FIG. 3 shows an embodiment of a scanning image recording method in the form of a flowchart.

For explanatory purposes, the invention will be described in detail below on the basis of embodiments. Here, FIG. 1 shows an endomicroscope 1 with a scanning device 11 as an embodiment of a scanning image generation apparatus. FIG. 2 schematically shows an image which has been obtained on the basis of a scanning image recording method using the endomicroscope 1. The embodiment is described on the basis of histology images that are intended to be evaluated by a pathologist. However, the invention can also be used within the scope of recording other images that are intended to be evaluated by a person.

The endomicroscope 1 shown in FIG. 1 comprises an optical fiber 3 with an input end 5 and an output end 7. The input end 5 is made to face a tissue region as observation object 9 and it is located in a scanning device 11, with the aid of which the end 5 can be moved along two lateral directions, referred to as x-direction and y-direction below, with respect to the observation object 9. In particular, the scanning device 11 can be realized by means of microelectromechanical systems (MEMS). By way of example, a scanning device using microelectromechanical systems is described in US 2016/0051131 A1 incorporated herein by reference. Reference is made to this publication in respect of the structure of a suitable scanning device.

The second end 7 of the optical fiber 3 faces a sensor 13, via which it is possible to capture luminous energy incident on the sensor 13. The sensor is located in a housing 15, which is embodied as a separate module in the present embodiment but which can also be embodied as a handle, and in which, moreover, a light source (not illustrated in the figure) for generating illumination light for illuminating the observation object 9 and an input coupling apparatus for coupling the illumination light into the second end 7 of the optical fiber 3 are housed. In particular, the light source can be a laser light source. However, the light source can also be arranged outside of the housing 15 and be connected to the latter by way of a light guide. Then, the output end of the light guide is situated in the housing 15. In this case, the input coupling apparatus couples the illumination light emerging from the output end of the light guide into the second end 7 of the optical fiber 3. The illumination light can be white light, that is, have a broadband spectrum, or light with a spectrum that consists of one or more narrowband spectral ranges, for example of one or more narrowband spectral ranges suitable for exciting a fluorescence in the observation object 9.

Illumination light coupled into the second end 7 of the optical fiber 3 is guided through the optical fiber 3 to the first end 5, from where the illumination light emerges in the direction of the observation object 9. Illumination light reflected by the observation object 9 or light excited by the illumination light and emitted by the observation object 9, for instance fluorescent light, enters into the first end 5 of the optical fiber 3 in turn and is guided from the latter to the second end 7, from where it emerges in the direction of the sensor 13. Moreover, focusing optical units can be located at, or in front of, the ends 5, 7 of the optical fiber 3 and these can be used to focus light onto the surface of the observation object 9 or onto the sensor 13. In particular, the endomicroscope 1 can be embodied as a confocal endomicroscope. In addition or as an alternative thereto, it can also be embodied as an endomicroscope for carrying out optical coherence tomography (OCT). Confocal microscopy and optical coherence tomography are well-known methods and are described in US 2010/0157308 A1 and U.S. Pat. No. 9,921,406 B2, for example, which are incorporated herein by reference. Therefore, the description of details in respect of confocal microscopy and in respect of optical coherence tomography is dispensed with in the scope of the present description. Instead, reference is made to US 2010/0157308 A1 and U.S. Pat. No. 9,921,406 B2.

The acquisition of image information items with the aid of the endomicroscope 1 is controlled with the aid of a computer 17 in the present embodiment, the computer being able to be considered a constituent part of the endomicroscope 1 in this sense. However, control can also be implemented by means of a dedicated control device of the endomicroscope 1, which may also be integrated in the housing 15, for example. The computer 17 is not required in this case. The computer 17 used for controlling in the present embodiment is connected both to the scanning device 11 and to the sensor 13. In the present embodiment, the scanning device 11 is controlled by the computer 17 in such a way that the observation object 9 is scanned along a grid 19 with grid points 21. The grid points 21 are illustrated schematically in FIG. 2. At each scanned grid point 21 there is an illumination of the observation object 9 with illumination light and a recording of the reflected illumination light or of the light emitted by the observation object 9 on account of an excitation by means of the illumination light. Then, the computer 17 generates an image from the reflected illumination light recorded at the grid points 21 or from light emitted by the observation object recorded at the grid points 21, the pixel grid of the image corresponding to the grid 19 used during the scanning.

In the present embodiment, the grid comprises grid lines which extend in the x-direction and grid columns which extend in the y-direction. Here, in the present embodiment, scanning of the observation object 9 is carried out line-by-line, that is, in such a way that a line is scanned, that is, there is a scan along the x-direction, and, after the line has been completed, there is an offset of the optical fiber 3 in the y-direction before a line extending in the x-direction is scanned again using the optical fiber 3, which has been offset in the y-direction. During the scanning procedure, the sensor 13 is exposed to each grid point 21, at which the optical fiber is situated at the time of a recording. In this way, an image of the observation object 9, as shown schematically in FIG. 2, is generated line-by-line with the aid of the sensor 13 and the scanning device 11. However, other scanning options are also possible, for example scanning along a helical scanning path.

A structure 23, which is only represented by a ring for illustrative purposes, is present in the image shown very schematically in FIG. 2. The structure can differ from other structures in the observation object in terms of its reflective behavior, its scattering behavior, its emission behavior, et cetera, for example. In the image illustrated in FIG. 2, all grid points 21 of the grid 19 have been used within the scope of the scanning image recording method. Grid points 21 which are situated above the structure 23 lead to a different signal on the sensor 13 than those grid points 21 which are not situated above the structure 23 on account of their reflection behavior that differs from the surroundings of the structure 23 or on account of their scattering behavior that differs from the surroundings of the structure 23 or on account of their emission behavior that differs from the surroundings of the structure 23, et cetera. In FIG. 2, the signal generated by the grid points 21 situated over the structure 23 is represented by hatched grid points 21.

A high resolution of structures 23 in the observation object 9 is possible with small dimensions of the grid points 21 and corresponding small pitches between the grid points 21, as are facilitated by the use of the optical fiber 3. In particular, a resolution facilitating the identification of structures of individual cells, such as the identification of the cell nucleus, is possible. In particular, it is possible to obtain resolutions of 10 µm or better, for example 5 µm, 3 µm, 1 µm or 0.7 µm. With such resolutions, it is possible to identify cells, which have dimensions ranging from 10 µm to 100 µm, or even cell constituents such as cell nuclei, which have dimensions ranging from 5 to 16 µm, in the image. Therefore, the image recorded can be used as a histology image, that is, as an image that facilitates a pathological evaluation of the tissue region illustrated in the image.

In the endomicroscope 1, the optical fiber 3, the scanning device 11 and the sensor 13 form an image information acquisition unit together with a data processing unit 25. In this case, the data processing unit 25 comprises a processor 27 and a main memory 29, in which the image information items obtained by the sensor 13 are temporarily stored. In this case, the processor 27 ensures that the image information items stored in the main memory 29 comprise a mapping of the intensities captured by the sensor 13 to the location of the respective grid point 21 in the grid 19. On the basis of these image information items stored in the main memory 29, the processor 27 then executes a software routine for assessing the image information items and for classifying the image information items as usable or unusable in view of a pathological evaluation of the histology image represented by the image information items. In the present embodiment, the software routine contains a trained neural network which has been trained with person-specific training data and which consequently represents a person-specific software routine. In the present embodiment, the training data contain a multiplicity of histology images, which are classified by an individual pathologist as histology images that are usable or unusable for a pathological assessment. In addition to the image information items which represent the respective histology images, the training data contain data associated with the image information items, the data reflecting the classification of the histology images, which represent the respective histology images, undertaken by the pathologist into the usable and unusable histology images. Then, the neural network is trained using this training data record such that, at the end, it can independently distinguish image information items representing usable histology images from image information items representing unusable histology images. Since the distinction in the training data is based on the work of a single pathologist, the neural network learns during training to make the distinction as per the criteria preferred by this pathologist. Therefore, the trained neural network facilitates person-specific assessment and classification of the image information items into those representing usable histology images and those representing unusable histology images.

In the present embodiment, the endomicroscope 1 comprises a non-volatile memory 31, in which a respective quality profile is stored for each of a number of pathologists. In each case, such a quality profile contains a variant of the neural network, which has been trained using training data of the corresponding pathologist such that the neural network of a quality profile applies the criteria preferred by the respective pathologist when assessing and classifying the image information items. Then, all that needs to be done is to call the quality profile stored for a pathologist from the memory 31 in order to ensure that the assessment of the image information items located in the main memory 31 and the classification thereof into usable or unusable is implemented on the basis of the criteria preferred by the pathologist. Together with the person-specific software routine, that is, together with the neural network trained in person-specific fashion in the present embodiment, the processor 27 forms an assessment unit in this sense for assessing the image information items located in the main memory 31 and for classifying the image information items as usable or unusable.

Moreover, the data processing unit 25 comprises a release unit 33 which releases the image recording process if the image information items are classified as usable by the assessment unit. To signal the release of the image recording process, the release unit 33 outputs a release signal in the present embodiment, the release signal prompting a loudspeaker 35 to output an information signal in the form of a buzzer that indicates the release. In addition or as an alternative thereto, there is the option of the release unit 33 outputting the release signal to the computer 17, for example, which indicates the release by an information signal presented on the screen thereof. As a further addition or alternative thereto, the release signal can lead to a haptic information signal being brought about, for example by the vibration of a handle.

Once the release has been signaled, the user has the option of prompting the actual image recording process. In the present embodiment, the user has the option of prompting the image information items stored in the main memory 29 to be transferred as a histology image to a non-volatile memory of the computer 17 by pressing a button on the operating unit of the endomicroscope 1 or by way of an entry into the computer 17. In particular, the non-volatile memory can be a hard disk drive or a solid-state drive (SSD) of the computer 17. However, storage on an optical drive of the computer 17 or on a USB stick connected to the computer is also possible. Moreover, there is also the option of the computer 17 directly sending the received image information items to a network as a histology image, without storing these in a non-volatile memory of the computer 17. If the endomicroscope 1 itself is connected to a network, the image information items located in the main memory 29 can also be sent to the network as a histology image by the endomicroscope 1. It is likewise possible to store the image information items located in the main memory 29 not in the non-volatile memory of the computer 17 but in the non-volatile memory 31 of the endomicroscope itself, and to read the latter at a later time.

In the present embodiment, the user is informed about the release by means of an information signal following the release signal and so they can prompt the actual image recording process. In the present embodiment, the endomicroscope, however, also comprises a trigger unit 37, which automatically triggers the image recording process if the release signal is present. Whether the image recording process is triggered automatically or needs to be triggered manually by the user can be set in the present embodiment in the operating unit of the endomicroscope 1 or by way of the computer 17.

As described above with reference to FIG. 2, the scanning imaging method can acquire, for example, image information items with a resolution of 1 µm or 0.7 µm. On account of the large number of grid points 21 to be scanned in connection with such a high resolution, the generation of a high-resolution histology image with the aid of the scanning imaging method requires comparatively much time. To reduce the time required for the recording there is the option of reducing the number of grid points 21 used during the scanning in order to increase the speed with which the scan can be carried out for a histology image. To this end, in the present embodiment, the scanning device 11 can be acted upon in controlling fashion by the computer 17 or by a dedicated control unit of the endomicroscope 1 in such a way that certain lines are omitted when scanning along the grid 19. Expressed differently, only every n-th line is scanned during scanning. By way of example, if only every fourth line of the grid 19 is used during scanning, it is possible to reduce the time required for scanning to approximately one quarter. If, moreover, only each n-th grid point is used in each line, it is possible to further reduce the time required for scanning. By way of example, if only every fourth line is used and only every fourth point is used in the used lines, the resolution of the acquired image reduces by a factor of 4. In the case of a maximum resolution of the endomicroscope of 0.7 µm, the reduced resolution would still be 2.8 µm, sufficient to identify cell structures such as the cell nucleus. In the case of a maximum resolution of 2.5 µm, the resolution would still be 10 µm, sufficient to identify individual cells in tissue structures. The assessment and classification of the image information items in view of the usability of the histology image represented thereby for a pathological evaluation is therefore also possible in the case of a reduced resolution, at least if the endomicroscope 1 has a high maximum resolution of 2.5 µm or better. Therefore, in the present embodiment, there is the option of recording the image information items, on the basis of which the assessment and classification is carried out, with a reduced resolution, particularly in the case of a high maximum resolution of 2.5 µm or better. As a result, the time period for acquiring the image information items required for the assessment and the classification can be reduced.

For reducing the time duration required for assessing and classifying the image information items the assessment already starts while the image information items are being acquired and the assessment is done on the basis of the image information items acquired up until that point. By way of example, if some of the lines of the grid have already been scanned, the image information items contained in this portion may already be sufficient to carry out the assessment and possibly determine that classification as a usable histology image is not possible. It is then possible to immediately terminate the scan following this determination and to undertake a new scan, possibly with altered recording parameters. This can reduce the time duration until image information items representing a usable histology image are available.

Figure 3:
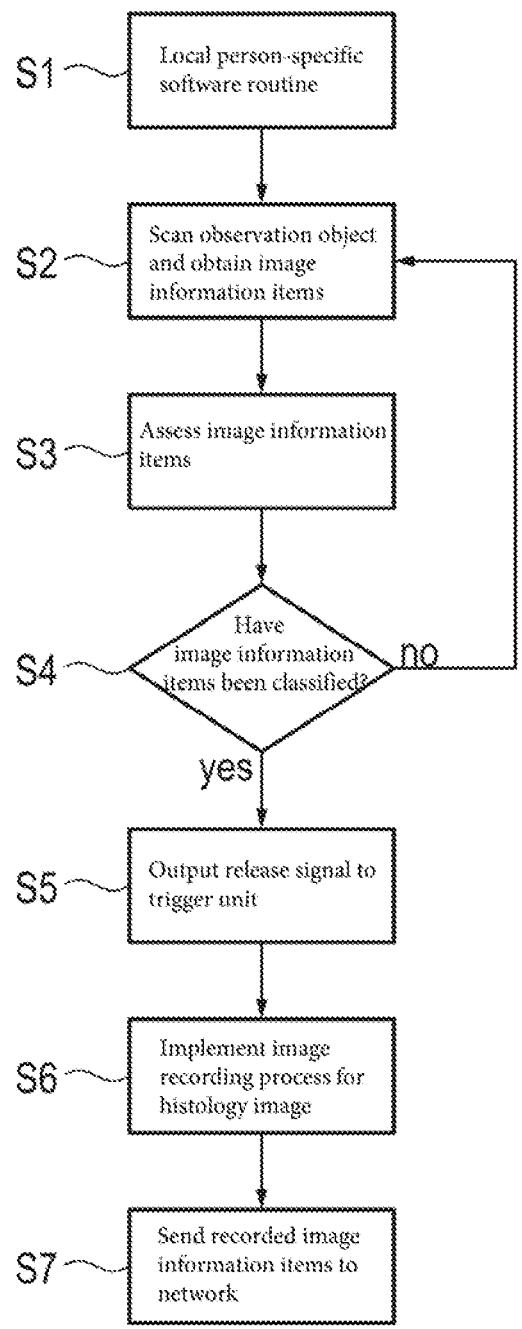

An embodiment for the sequence of the scanning image recording method according to the invention is described below with reference to FIG. 3. The figure shows the embodiment on the basis of a flowchart.

In step S1 of the embodiment, the user of the endomicroscope 1 loads into the data processing unit 25 a person-specific software routine for assessing and classifying acquired image information items from a quality profile, located in the non-volatile memory 31, of the pathologist who is to evaluate a histology image recorded with the aid of the recording method. In the present embodiment, the person-specific software routine contains a neural network trained with specific training data of the pathologist. By loading the person-specific software routine, the user adapts the assessment and classification of acquired image information items to the criteria preferred by the pathologist. Should the histology image be evaluated by a team of pathologists, a respective person-specific software routine can be loaded in Step S1 for each pathologist in the team from a quality profile assigned to the corresponding pathologist. Alternatively, there is the option of a quality profile assigned to the team being available for the team of pathologists, the quality profile containing a person-specific software routine for each pathologist in the team. In this case, the person-specific software routines can be loaded from the quality profile of the team in step S1.

Then, in step S2, the tissue region forming the observation object 9 is scanned along the grid points 21 with the aid of the scanning unit 11, with image information items representing a histology image being acquired. In the present embodiment, scanning in step S2 is implemented with a reduced resolution in order to quickly obtain assessable image information items.

In step S3, the trained neural network assesses the image information items acquired in step S2 and classifies the image information items representing the histology image on the basis of the assessment into one of the classes of "image information items usable as a histology image" or "image information items unusable as a histology image", depending on whether or not the assessment has yielded that the histology image represented by the image information items is usable for a pathological evaluation. In the case of a team of pathologists, the assessment and classification can be implemented on the basis of the person-specific software routines for all team members. In this case, there is the option of classifying the image information items representing the histology image in the "image information items usable as a histology image" class only if each individual person-specific software routine for the team members assesses the image information items as usable. Alternatively, there is the option of already classifying the image information items representing the histology image in the "image information items usable as a histology image" class once a majority of the person-specific software routines for the team members have assessed the image information items as usable. In the present embodiment, the assessment and the classification already starts while the image information items are being acquired Then, a check is carried out in step S4 as to whether the image information items representing the histology image have been classified in the "image information items usable as a histology image" class in step S3. Should this be the case, the method advances to step S5. By contrast, if the image information items representing the histology image are determined as having been classified in the "image information items unusable as a histology image" class in step S4, the method returns to step S2, in which a new scan is carried out, optionally with different parameters for the illumination, the focusing, et cetera. The image information items located in the main memory 29 to this point are overwritten by the image information items acquired during this new scan.

If the image information items representing the histology image are determined as having been classified in the "image information items usable as a histology image" class in step S4, the release unit 33 outputs a release signal in step S5. In the present embodiment, this release signal is output to the trigger unit 37 which thereupon triggers the actual image recording process for the histology image in step S6. However, it is understood that it is also possible for the release signal to bring about optical and/or acoustic and/or haptic information for the user, indicating to the latter that they can now manually trigger an image recording process.

In the present embodiment, the image recording process for the histology image in step S6 is implemented with the full resolution of the endomicroscope 1. The image information items acquired during this image recording process are subsequently in step S7 sent to a network or stored in a non-volatile memory as the histology image. Naturally, there is also the option of no new scan being carried out within the scope of the image recording process, for example if the resolution of the scan carried out in step S2 is sufficient for a pathological evaluation of the histology image represented by these image data records or because the scan in step S2 has already been carried out at the maximum resolution. In this case, the image recording process merely consists in sending the image information items contained in the main memory 29 to the network or transmitting the image information items to the non-volatile memory, in each case as a histology image. On the basis of the histology image sent to the network or on the basis of the histology image transmitted to the non-volatile memory, the pathologist is then able to undertake a pathological evaluation for the tissue represented by the recorded histology image.

Since the neural network trained with specific training data of the pathologist is used in step S3 for assessing and classifying the image information items, it is possible to reliably ensure that the pathologist only receives those histology images which they can in fact evaluate. Secondly, it is also possible to reliably prevent a case where the pathologist does not receive histology images which they could have evaluated. Consequently, the method according to the invention facilitates, in real time, a particularly targeted selection of the histology images evaluable by the pathologist by means of the scanning image recording apparatus.

The present invention has been described in detail on the basis of embodiments for explanatory purposes. However, a person skilled in the art recognizes that deviations from the embodiments are possible within the scope of the invention. By way of example, instead of the neural network trained with specific training data of the pathologist, the person-specific software routine can contain a person-specific algorithm which ascertains at least one image quality value, which compares the at least one ascertained image quality value with at least one classification criterion and which undertakes the classification on the basis of the result of the comparison, wherein parameter values of the algorithm used when ascertaining the image quality value and/or the at least one specified release criterion have been specifically selected by the pathologist. Moreover, a quality profile can contain a plurality of person-specific software routines for the same person which can differ from one another, for example, in terms of the histology images used during the training in the case of neural networks or in terms of their parameter values or their release criteria in the case of algorithms. By loading a suitable person-specific software routine, the assessment and classification can be adapted, for example, to different recording techniques for recording histology images, for example to histology images acquired by means of fluorescence or to histology images acquired on the basis of light reflected at the tissue. The image generation apparatus according to the invention and the method according to the invention can also undertake a selection for other images to be evaluated instead of histology images, and so the use of the image generation apparatus according to the invention and the method according to the invention is not restricted to the recording of histology images described within the scope of the embodiments. Further deviations from the embodiments are possible, as has already been indicated within the scope of the description of the embodiments. Therefore, the present invention is not intended to be restricted to the specific embodiments, but rather only by the appended claims.

It is understood that the foregoing description is that of the preferred embodiments of the invention and that various changes and modifications may be made thereto without departing from the spirit and scope of the invention as defined in the appended claims.

LIST OF REFERENCE SIGNS

1 Endomicroscope
3 Optical fiber
5 1st fiber end
7 2nd fiber end
9 Observation object
11 Scanning device
13 Sensor
15 Housing
17 Computer
19 Grid
21 Grid point
23 Structure
25 Data processing unit
27 Processor
29 Main memory
31 Non-volatile memory
33 Release unit
35 Loudspeaker
37 Trigger unit
S1 Loading the person-specific software routine from the quality profile
S2 Scanning at low resolution
S3 Assessing and classifying the image information items
S4 Image information items usable?
S5 Outputting a release signal
S6 Scanning at high resolution
S7 Sending to a network or storing on a non-volatile storage medium

What is claimed is:

1. A scanning image generation apparatus comprising:
an image information acquisition unit for scanning grid points of an object and for acquiring items of image information based upon the scanned grid points with said items of information defining an image;
said image information acquisition unit being configured to scan fewer of said grid points for acquiring said items of image information to be evaluated and classified than for said image recording;
an evaluation unit having a person-specific software routine for evaluating at least a portion of said items of image information and for classifying the items of image information as usable items of image information and unusable items of image information on the basis of the evaluation;
a release unit for enabling an image recording in response to a determination by said evaluation unit that the evaluated items of image information are classified as usable;
a memory having at least one quality profile stored therein;
said quality profile having at least one person-specific software routine for evaluating and classifying said items of image information;
said person-specific software routine being configured to be loadable into said evaluation unit;
said evaluation unit being configured to evaluate and classify said items of image information already during acquisition thereof, on the basis of said at least a portion of said items of image information represented by said fewer of said grid points of a multi grid point image already scanned; and, wherein said person-specific software routine includes one of the following:
  i) a trained neural network trained with person specific training data; or,
  ii) a person-specific algorithm ascertaining at least one image quality value and comparing the at least one ascertained image quality value with at least one classification criterion.

2. The scanning image generation apparatus of claim 1, wherein a plurality of quality profiles are stored in said memory and a selection unit is provided to select at least one of the stored quality profiles, the at least one person-specific software routine of which being loaded into the evaluation unit.

3. The scanning image generation apparatus of claim 1, wherein said release unit is configured to output an enabling signal to a signal unit when the evaluated items of image information have been classified as usable by said evaluation unit; and, said signal unit is configured to output an information signal indicating that the image recording is enabled upon receipt by said signal unit of said enabling signal.

4. The scanning image generation apparatus of claim 1, wherein said release unit is configured to output an enabling signal to a triggering unit in response to said evaluation unit classifying the evaluated items of image information as being usable; and, said triggering unit is configured to automatically trigger the image recording upon receiving said enabling signal.

5. A scanning image recording method of an object defined by a plurality of grid points, the method comprising the steps of:
  scanning fewer of said grid points of the object and obtaining items of image information defining an image based on the scanned fewer of said plurality of grid points;
  applying a software routine to evaluate at least some of said items of image information and classifying the items of image information as usable or unusable based upon the evaluation;
  enabling the image recordation when the evaluated said items of image information are classified as usable;
  wherein at least one person-specific software routine is applied as said software routine for the evaluation and classification of said items of image information and the evaluation and classification of the items of image information takes place already during capture based on that portion of said items of image information represented by those grid points of a multi grid point image already scanned; and,
  wherein the at least one person-specific software routine includes one of the following:
    i) a trained neural network trained with person specific training data; or,
    ii) a person-specific algorithm ascertaining at least one image quality value and comparing the at least one ascertained image quality value with at least one classification criterion.

6. The scanning image recording method of claim 5, wherein the at least one person-specific software routine is loaded from at least one stored quality profile.

7. The scanning image recording method of claim 6, the method comprising the further steps of:
  providing a plurality of stored quality profiles, each with at least one person-specific software routine;
  loading two or more persons-specific software routines from the quality profiles;
  providing that the software routine for evaluating and classifying the items of image information includes two or more person-specific software routines; and,
  enabling the image recording when the evaluated items of image information are classified as usable by at least the majority of the person-specific software routines.

8. The scanning image recording method of claim 7, wherein an enabling signal is outputted when the at least one person-specific software routine has classified the evaluated items of image information as usable.

9. The scanning image recording method of claim 8, wherein, following the enabling signal, an information signal signaling the enablement is outputted and/or the image recording is automatically triggered.

10. The scanning image recording method of claim 5, wherein the image is transferred to a non-volatile storage medium or transmitted to a network within the scope of the image recording process.

* * * * *